US006927811B2

(12) United States Patent
Jang

(10) Patent No.: US 6,927,811 B2
(45) Date of Patent: Aug. 9, 2005

(54) METHOD FOR MINIMIZING MOIRE PHENOMENON IN REFLECTIVE TYPE LIQUID CRYSTAL DISPLAY ASSEMBLY AND REFLECTIVE TYPE LIQUID CRYSTAL DISPLAY ASSEMBLY AND LIGHT SUPPLY UNIT AND METHOD FOR FABRICATING LIGHT DISTRIBUTION ALTERATION UNIT THEREOF

(75) Inventor: Yong-Kyu Jang, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/928,123

(22) Filed: Aug. 30, 2004

(65) Prior Publication Data

US 2005/0030452 A1 Feb. 10, 2005

Related U.S. Application Data

(62) Division of application No. 10/101,916, filed on Mar. 21, 2002, now Pat. No. 6,784,958.

(30) Foreign Application Priority Data

Mar. 22, 2001 (KR) ........................................ 2001-14935

(51) Int. Cl.[7] ............................................ G02F 1/1335
(52) U.S. Cl. .......................................... 349/63; 349/113
(58) Field of Search .............................. 349/61, 62, 63, 349/64, 65, 113; 362/26, 31

(56) References Cited

U.S. PATENT DOCUMENTS

| 6,266,108 B1 | 7/2001 | Bao et al. ...................... 349/63 |
| 6,693,683 B2 | 2/2004 | Ishitaka ........................ 349/65 |
| 6,727,963 B1 * | 4/2004 | Taniguchi et al. ............. 349/65 |
| 6,863,413 B1 * | 3/2005 | Umemoto ..................... 362/31 |

* cited by examiner

Primary Examiner—Kenneth Parker
Assistant Examiner—David Chung
(74) Attorney, Agent, or Firm—McGuireWoods LLP

(57) ABSTRACT

A liquid crystal display (LCD) that minimizes moire phenomenon to prevent display performance degradation in the LCD is provided. The present invention also minimizes loss of the light supplied to a LCD panel and achieves high luminance with low power consumption. When a light transforming unit for uniformly forming light distribution of light supplied from a light source is overlapped with a reflective electrode of the reflective type LCD, the moire is generated. The more and light leakage generated in the light transforming unit are prevented by changing in a structure of the light transforming unit. Therefore, a display operation of the reflective type LCD operates normally even in a dark place.

3 Claims, 13 Drawing Sheets

METHOD FOR MINIMIZING MOIRE PHENOMENON IN REFLECTIVE TYPE LIQUID CRYSTAL DISPLAY ASSEMBLY AND REFLECTIVE TYPE LIQUID CRYSTAL DISPLAY ASSEMBLY AND LIGHT SUPPLY UNIT AND METHOD FOR FABRICATING LIGHT DISTRIBUTION ALTERATION UNIT THEREOF

CROSS REFERENCE

This application is a divisional application of Applicant's co-pending U.S. patent application Ser. No. 10/101,916 filed on Mar. 21, 2002, now U.S. Pat. No. 6,784,958, which is herein specifically incorporated by reference in its entirety.

BACKGROUND OF THE INVENTION

1. Field of the Invention

The present invention relates to a liquid crystal display (LCD), and more specifically to an illumination method of removing moire phenomenon in a reflective type LCD assembly that minimizes moire phenomena and light leakage, which are frequently generated in the reflective type LCD assembly, without display performance degradation, and a reflective type LCD assembly using the same. A light supply unit for assembly, and a method of fabricating a light distribution alteration unit thereof are also disclosed.

2. Description of the Related Art

Generally, an LCD is one kind of flat panel displays precisely. LCD controls an electro-optical property of liquid crystal to display an image and converts image data of electric signals to a picture that a user can recognize.

In order to perform an improved display operation through the LCD, it is very important to control both material characteristic and optical characteristic of the liquid crystal. However, in view of the fact that the liquid crystal is a light receiving device, it is also very important to efficiently use a light source which is supplied to the liquid crystal.

In case there is not provided the light source, or the light source is not efficiently used, even the precisely controlled liquid crystal of the LCD cannot allow the user to recognize any data through the LCD.

According to the use of the light source, LCDs are classified into a reflective type LCD in which the display operation is performed using an external light source, and a backlight LCD in which light is generated using its own charged energy and the display operation is performed using the light.

The reflective type LCD that displays images using only the light from the external light source consumes much less power compared to the backlight LCD. However, without external light source, the user cannot recognize the display.

This is a fatal disadvantage in a display device if the device cannot operate in any conditions or environments.

To solve the problem, there has been provided an improved reflective type LCD assembly that, if the light is insufficiently supplied from the external light, generates additional lights to normally perform the display operation, thereby having advantages of both the reflective type LCD and the backlight LCD.

In order to achieve an improved reflective type LCD assembly 100, as shown in FIGS. 1 and 2, an LCD 10 in which the liquid crystal is controlled to adjust an optical transmittance and a light supply unit 20 that supplies the light to the LCD 10 with small power consumption are necessary.

At this time, the light supply unit 20 has a light source 21 and first and second optical members 25 and 27 for uniformly supplying the light generated from the light source 21 to the LCD 10.

More particularly, a point light source type of light emitting diode (LED) with a power consumption of only a few to a few tens mW is mostly served as the light source 21.

By using the point light source type LED, the power consumption can be remarkably reduced.

However, if the LED is directly applied to a desired portion of the LCD 10, some parts of the LCD 10, which are near to the LED, are bright, but other parts, which are far from the point light source, are dark. In other words, the luminance difference in a display screen degrades the display performance of the LCD.

In order to cure the non-uniform luminance problem of the LED as described above, the first optical member 25 and the second optical member 27 are necessary to indirectly transform the light generated from the point light source type LED into the planar light.

The first optical member 25 and the second optical member 27 transform the light from the point light source type LED into the linear light, and then the linear light into the planar light.

Particularly, the first optical member 27 has a desired length to transform the point light source into the linear light source type. The first optical member 27 is formed into a square rod, and provided with the point light source at an end thereof.

As shown in FIG. 1, the first optical member 27 irradiates the light in an angle of 2.

The linear light source formed by the first optical member 27 should be transformed into the planar light source. However, in order to achieve the planar light source, a complicated optical mechanism is required.

As shown in FIGS. 1 and 2, the light irradiated from the first optical member 27, which has a light distribution in the linear light source, is transferred to the second optical member 25 in the form of a square plate. On an upper portion of the second optical member 25, there is formed a sawtooth-shape light reflective pattern 25a.

At this time, the light coming from the first optical member 27 is uniformly transferred from a front portion 25b of the light reflective pattern 25a, which is adjacent to the first optical member 27, to a rear portion 25c of the light reflective pattern 25a.

Therefore, the light irradiated from the first optical member 27 is transformed into the light having the light distribution in the planar light source.

The planar light transformed by the second optical member 25 is then incident onto the reflective type LCD 10.

Then, the incident light on the reflective type LCD 10 is reflected by a reflective electrode 15 which is formed in the reflective type LCD 10 in the form of a matrix, and is passed again through the second optical member 25, and is then incident on user's eyes so that the user can visually recognize desired information.

The improved reflective type LCD assembly 100 can display images even in a dark place.

The light reflective pattern 25a that provides planar light source, overlaps with the reflective electrode 15 formed in the LCD 10. If two patterns are overlapped each other as described above, a moire pattern may be generated, degrading the display performance.

To solve the problem, an aligning angle between the light reflective pattern 25a and the reflective electrode 15 has been changed to avoid parallel alignment of each other but to form a cross alignment.

At this time, when the aligning angle between the light reflective pattern 25a and the reflective electrode 15 is about 22.5°, as shown in FIG. 2, the moire phenomenon is the least generated.

However, even though the light reflective pattern 25a and the reflective electrode 15 are aligned to cross each other, narrower pitches of the light reflective pattern 25a and the reflective electrode 15 may generate the moire phenomenon again.

To this end, the moire phenomenon is not a problem in a conventional mid and small-sized LCD having low resolution. However, in a large-sized LCD, the narrow pitches of the light reflective pattern 25a and the reflective electrode 15 generate the moire phenomenon again.

Further, if the light reflective pattern 25a and the reflective electrode 15 are tilted at a desired angle, e.g., 22.5°, only a half of the light reflected by the light reflective pattern 25a goes to the reflective electrode 15, and the rest of the light goes to an undesired place by the tilted light reflective pattern 25a. Therefore, there is another problem that an entire luminance of the reflective type LCD assembly is lowered, and a power consumption of the assembly is thus increased.

Recently, to solve the problem, it was attempted to conform the pitch of the light reflective pattern 25a to the pitch of the reflective electrode 15, thereby reducing the moire.

However, if the pitch of the reflective electrode 15 changes, the light reflective pattern 25a should be re-fabricated. Further, if the light reflective pattern 25a and the reflective electrode 15 do not align correctly, it creates the moire again, and lowers the display. In this case, the power consumption also increases because of the low luminance.

SUMMARY OF THE INVENTION

Therefore, it is an object of the present invention to provide a reflective type LCD with a minimal light source that prevents the degradation of the display performance, and the light supplied to an LCD panel is minimally lost to achieve high luminance at low power consumption.

It is another object of the present invention to provide a method for minimizing the moire in the reflective type LCD, thereby improving the display performance.

It is still another object of the present invention to provide a light supply unit in the reflective type LCD so as to remove the moire that degrades the display performance and achieves a high luminance with less power consumption.

It is yet still another object of the present invention to provide a method for fabricating a light alternation unit in the reflective type LCD so as to remove the moire that degrades the display performance and achieves a high luminance with less power consumption.

To achieve the aforementioned object of the present invention, there is provided a method for minimizing moire phenomenon in a reflective type LCD assembly, comprising the steps of generating a first light having continuous light distribution, supplying the first light to a plurality of light reflecting patterns having irregular widths in a predetermined range, and transforming the first light into a second light having non-uniform light distribution, supplying the second light to each of reflective electrode patterns of a reflective type LCD, which has a constant pitch and passing the second light reflected by the reflective electrode patterns through the light reflecting patterns to remove the moire.

Further, there is provided a reflective type liquid crystal display assembly comprising: a light supplying member which is provided with a light source for generating a first light having a continuous light distribution, and a light transforming member which has a light reflecting pattern having an irregular width in a predetermined range so as to transform the first light in a second light having non-uniform light distribution in the predetermined range; and a liquid crystal display device which is provided with a reflective electrode formed at a lower portion of the light reflecting pattern to have a constant pitch, a switching device for supplying power to the reflective electrode, a common electrode which is opposite to the reflective electrode and liquid crystal which is injected between the reflective electrode and the common electrode.

Further, there is provided a light supplying unit comprising a light source for generating a first light having continuous light distribution; and a light transforming member which is formed on a base substrate having a desired transmittance to transform the first light supplied from an outside into a second light having an irregular width in a predetermined range and then supply the second light to a reflective electrode having a constant pitch.

There is provided a method for fabricating a light distribution alternation unit used in a reflective type LCD, comprising steps of calculating pattern data for preventing moire phenomenon in a display operation, based on a reflective electrode, forming a light transforming pattern on a photoresist layer corresponding to the pattern data, depositing a predetermined material on the light transforming pattern to form a preliminary mold, forming a mold of the light transforming member through a medium of the preliminary mold, and forming the light transforming member using the mold.

BRIEF DESCRIPTION OF THE DRAWINGS

The above and other advantages of the present invention will become more apparent by describing in detail the preferred embodiments thereof with reference to the attached drawings.

DETAILED DESCRIPTION OF THE PREFERRED EMBODIMENTS

Figure 1:
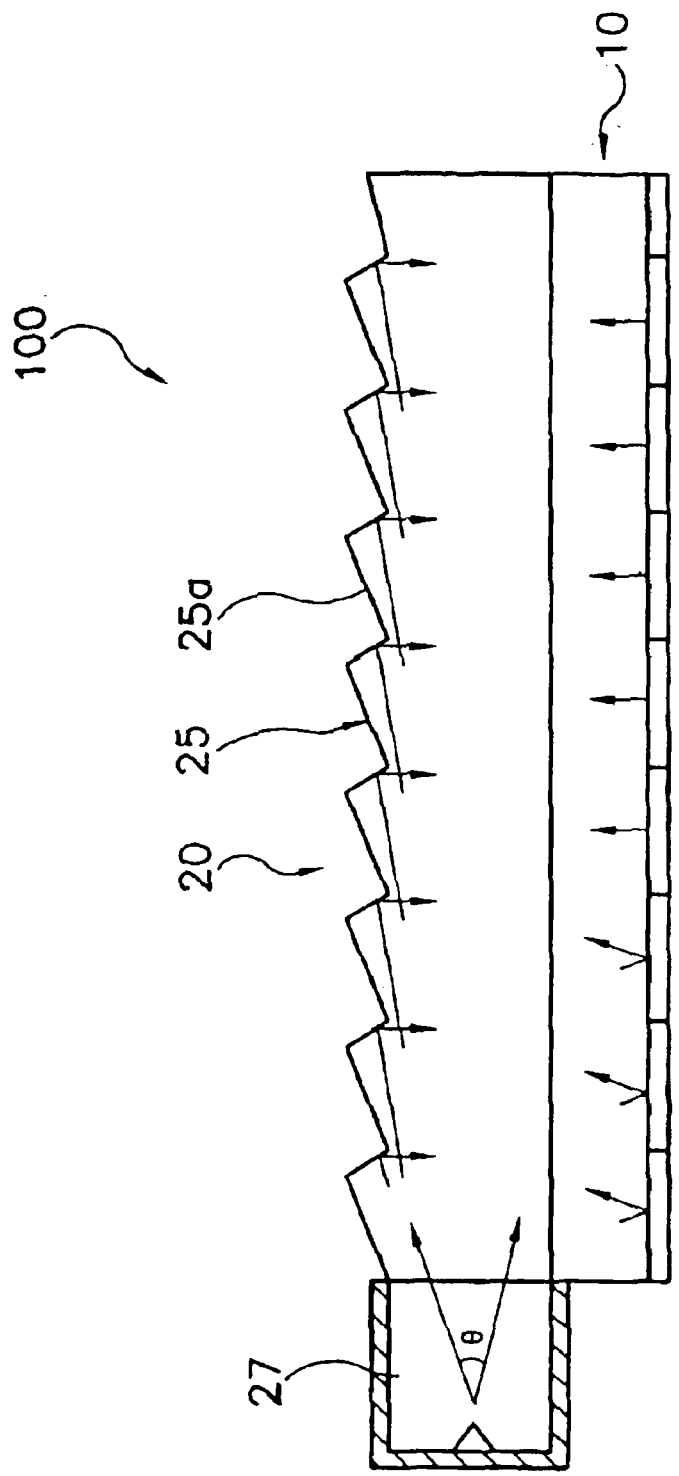
FIG. 1 is view of a conventional reflective type LCD.
Figure 2:
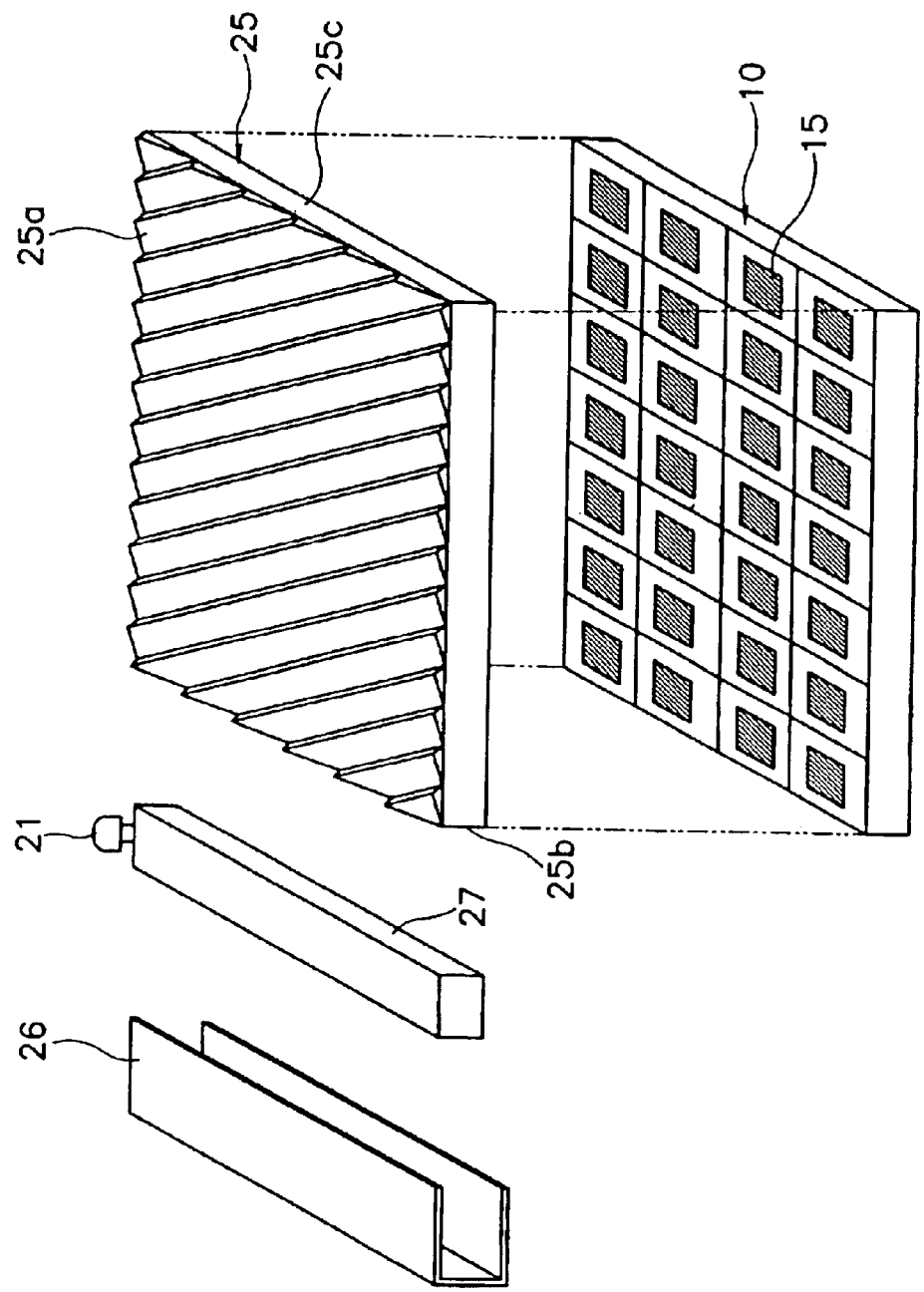
FIG. 2 is an exploded perspective view of the conventional reflective type LCD.

Now, preferred embodiments of the present invention will be described in detail with reference to the attached drawings.

First, a method for minimizing moire phenomenon in a reflective type LCD will be described, and a reflective type LCD assembly for realizing the method, a light supply unit and a method of fabricating a light distribution alternation unit will be described.

Now, the method for minimizing moire phenomenon in a reflective type LCD will be described in details.

In order to see the reflective type LCD assembly even in a dark place, a light source should supply lights to the reflective type LCD.

At this time, the light supplied to the reflective type LCD is generated from a light source having a continuous light distribution. It does not matter what kind of light source is used in the reflective type LCD. Usually, a cold cathode fluorescent lamp or an LED with lower power consumption is used. Hereinafter, a first light means the light generated from the light source.

The first light generated from the light source is transformed into a second light having uniform light distribution by a light distribution alternation unit.

The light distribution alternation unit is formed into a flat plate type or a wedge type. A light reflecting pattern is formed on a surface of the light distribution alternation unit. That is, the first light generated from the light source is transformed into the second light having the uniform light distribution by the light reflecting pattern.

Then, the second light is incident on the LCD assembly on which the reflective electrode is formed in the shape of a matrix. The light re-reflected by the reflective electrode is emitted through the light distribution alternation unit to outside.

When the reflective type LCD is illuminated in the above manner, a user can recognize an image even in the dark place. However, since the light reflecting pattern of the light distribution alternation unit and a pattern of the reflective electrode are positioned on the same light passage, i.e., overlapped each other, the user experiences the moire, which is frequently generated in the two overlapped pattern, when recognizing the light passed through the reflective electrode and the light distribution alternation unit.

Generally, the moire is helpfully used in a field of measuring equipments or medical implements. However, the moire in a display device causes a serious problem of lowering display performance.

In order to prevent the moire, two methods are proposed.

In the first method, the first light generated from the light source arrives at the light distribution alternation unit and is transformed into the second light. The second light is reflected by the reflective electrode and then emitted through the light distribution alternation unit. At this time, the second light has non-uniform light distribution so as to prevent the moire. In the second method, a pitch of the reflective electrode is irregularly formed.

However, when the pitch of the reflective electrode is irregularly formed, as described in the second method, it is difficult to perform a precise display operation. Therefore, the first method is preferably employed in the present invention to prevent the moire.

In order for the second light to have the non-uniform light distribution, a width of the light reflecting pattern of the light distribution alternation unit is randomly formed.

Although the width of the light reflecting pattern is random, it has a certain rule.

If the width of the light reflecting pattern is randomly formed without the certain rule, in some parts of the entire displaying surface area, by accident, the reflective electrode and the light reflecting pattern may be located at a desired position in which the moire is not generated, thereby preventing the moire.

However, when in the most of the displaying surface area, the reflective electrode and the light reflecting pattern may be located at a position in which the moire is generated and generate moire.

In conclusion, if the width of the light reflecting pattern is not randomly formed based on the certain rule, a position where the moire is generated and another position where the moire is not generated may coexist on a screen having a desired displaying surface area. This degrades the displaying performance.

In a rule of light distribution alteration for preventing the above case, the number of the reflective electrode and the light reflecting pattern is determined at a desired ratio, and the width of the light reflecting pattern is randomly set in a predetermined range.

At this time, the desirable ratio is about 1:1, and the predetermined range is the pitch of the reflective electrode area or up to a half of the pitch.

Further, all the light reflecting patterns, which vary randomly in the predetermined range to remove the moire, may be formed in a similar figure, but each of the light reflecting patterns has a different height.

Alternatively, the light reflecting patterns may be formed to have the same height, but respectively formed into different shapes.

If the reflective type LCD is lighted as described above, even though the light reflecting pattern and the reflective electrode are not tilted, the moire is not generated, and also the luminance is not lowered by light leakage. Therefore, the reflective type LCD can operate, consuming less power.

Now, an apparatus structure for realizing the reflective type LCD assembly according to the illumination method and an operation of the apparatus structure will be described in details referring to the attached drawings.

Figure 3:
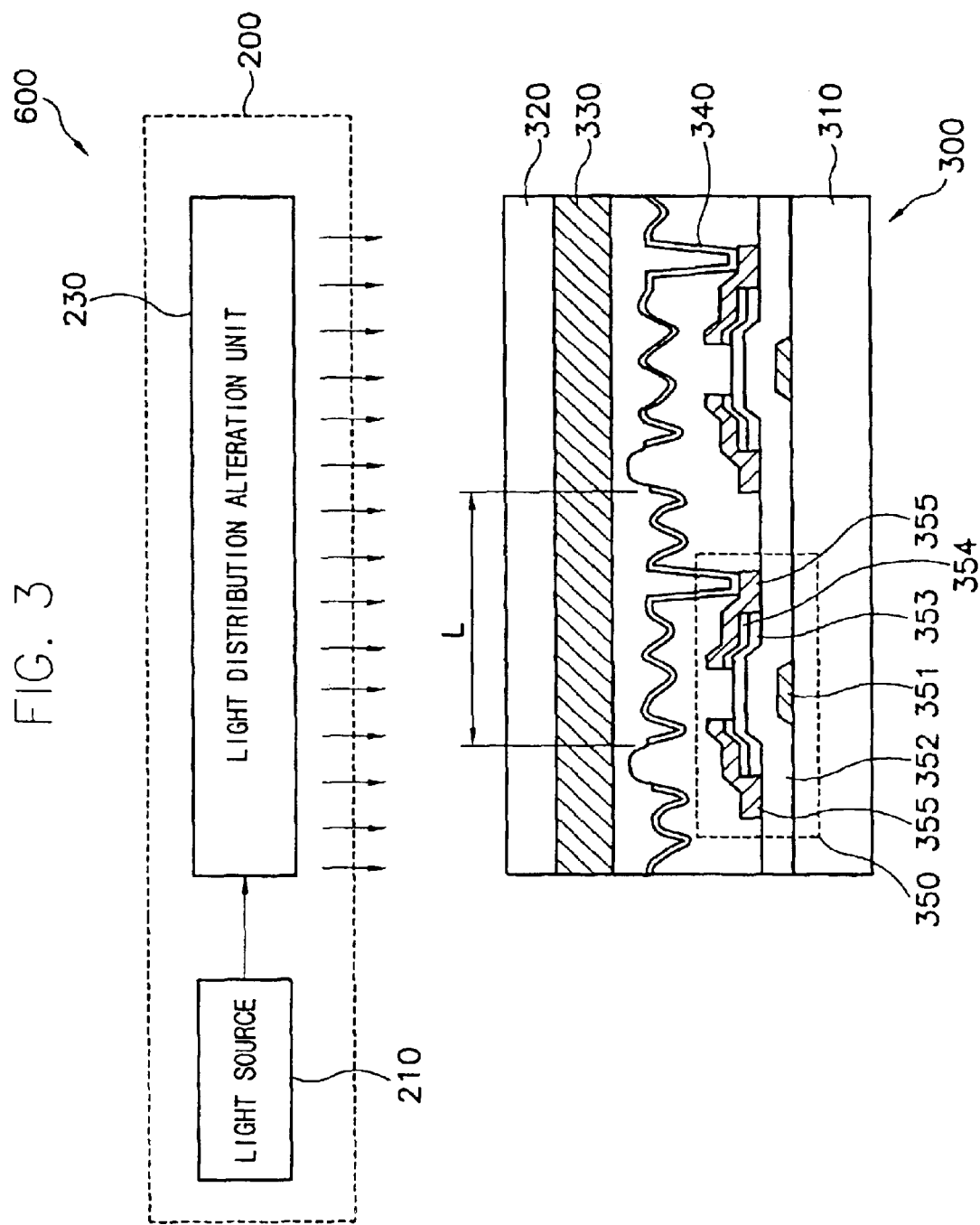
FIG. 3 is a cross-sectional view of a liquid crystal assembly according to an embodiment of the present invention.

FIG. 3 shows a reflective type LCD assembly for preventing the moire according to an embodiment of the present invention.

A reflective type LCD assembly 600 according to the present invention includes a light supply unit 200 and a reflective type LCD 300.

The reflective type LCD 300 has a TFT substrate 310 on which a pixel is formed, a color filter substrate 320 which is aligned to be opposite to the TFT substrate 310, a liquid crystal layer 330 formed between the TFT substrate 310 and the color filter substrate 320, and a reflective electrode 340 as a pixel electrode formed between the TFT substrate 310 and the liquid crystal layer 330.

The TFT substrate 310 has a thin film transistor 350 as a switching device. As shown in FIG. 3, the thin film transistor 350 comprises a gate electrode 351, a gate insulating film 352, a semiconductor layer 353, an ohmic contact layer 354, a source electrode 355 and a drain electrode 355. The undescribed reference L is a width of the reflective electrode.

In order to allow the reflective type LCD 300 to operate normally even in the dark place, the light supplying unit 200 is disposed at an upper portion of the reflective type LCD 300.

The light supply unit 200 has a light source 210 and a light distribution alteration unit 230.

For example, an LED or a cold cathode fluorescent lamp with the very low power consumption is used as the light source 210.

At this time, though the LED or the cold cathode fluorescent lamp is used as the light source 210, it is very difficult to generate the uniform luminance over the entire surface area of a displaying screen. The light distribution alteration unit 230 is necessary for compensating the luminance over the entire displaying surface area.

The light distribution alteration unit 230 transforms the light into a planar light source to uniformly supply the light over the entire surface area of the reflective type LCD 300.

The light distribution alteration unit 230 has an additional function. The light distribution alteration unit 230 prevents the moire generated when the light supplied to the reflective type LCD 300 is then reflected to reach user's eyes.

Now, various embodiments of a process for supplying the light to the reflective type LCD 300 and the light distribution alteration unit 230 for preventing the moire generated during the process will be described.

Figure 4:
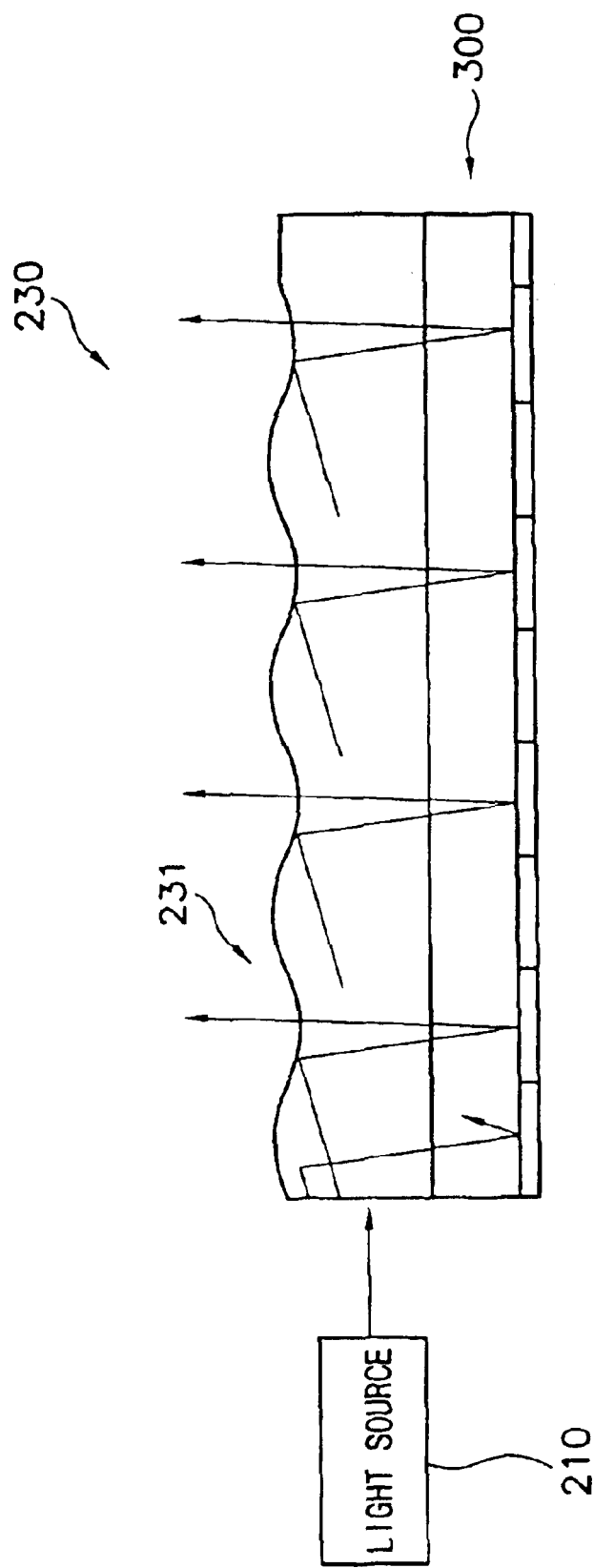
FIG. 4 is a view of the liquid crystal assembly according to a first embodiment of the present invention.

FIG. 4 shows the light distribution alteration unit 230 according to a first embodiment of the present invention, and FIGS. 5, 6, 7 and 8 show a fabricating method of the light distribution alteration unit 230 according to the present invention.

Referring to FIG. 4, the light distribution alteration unit 230 is formed into a plate type. On an upper face of the light distribution alteration unit 230, a light reflecting pattern 231 is formed to prevent the moire.

The number of the light reflecting pattern 231 is determined in a desired ratio with respect to the reflective electrode 340. Preferably, the desired ratio is about 1:1.

At this time, the moire may be generated or not, depending on the width of the reflecting pattern 231 for preventing the moire.

In an embodiment of the present invention, the width of the reflecting pattern 231 is calculated using a computer generating CGH hologram system. The light distribution alteration unit 230 having the reflecting pattern 231 for preventing the moire is fabricated based on calculated data.

In order to calculate the width of the reflecting pattern 231, pitch data of the reflective electrode 340 are necessary.

The CGH system calculates the width of the reflecting pattern 231 for preventing the moire so that the reflecting pattern 231 has a random value in a predetermined range corresponding to the reflective electrode 340.

At this time, it is preferred that the predetermined range is set to the pitch of the reflective electrode 340 or a half of the pitch.

Figure 5:
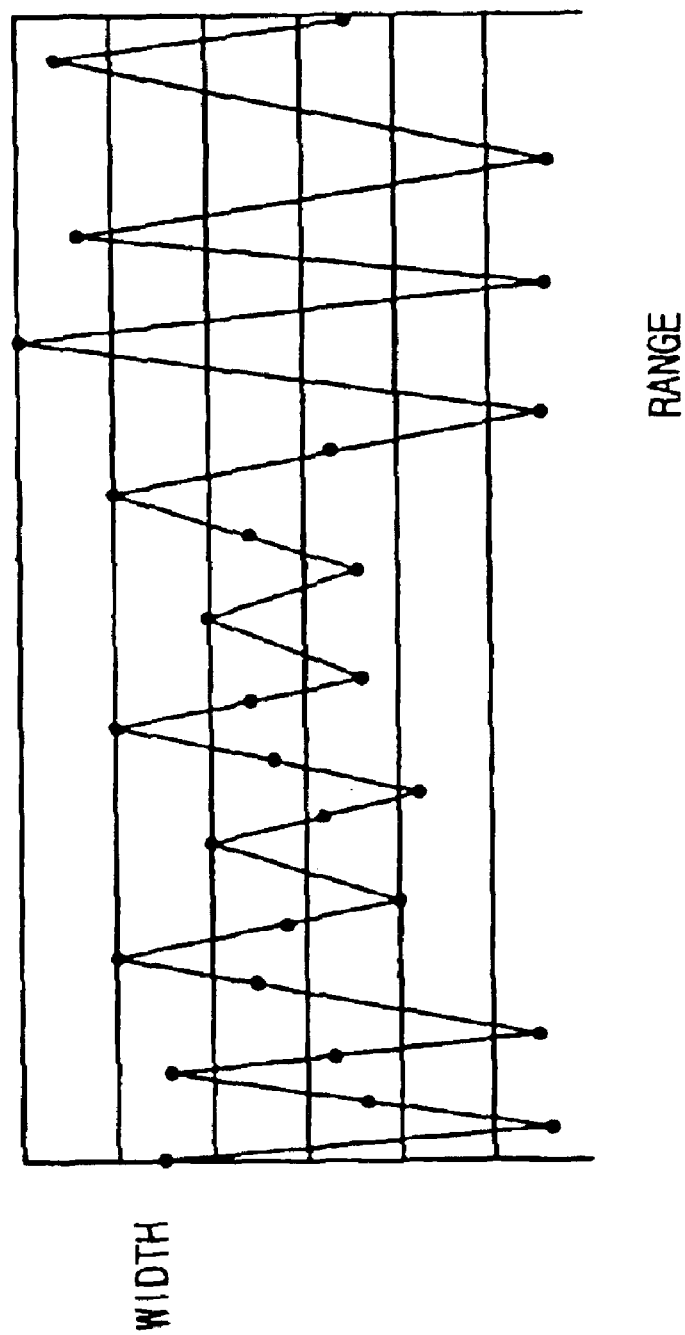
FIG. 5 is a graph showing a state that a width of each light reflecting pattern shown in FIG. 4 varies randomly in a predetermined range.

FIG. 5 shows a graph of each calculated width of the reflecting pattern 231 for preventing the moire. A vertical axis is the random width of the reflective pattern 231.

That is, each width of the reflecting pattern 231 is randomly added or subtracted based on a central line of the graph. A simulation is performed with the calculated data to confirm whether the moire is generated. The width of the reflecting pattern 231 is corrected at a place where the moire is generated.

If data for forming the reflecting pattern 231 are generated in the above-mentioned way, the light distribution alteration unit 230 having the reflecting pattern 231 is fabricated based on such data.

A fabricating process of the light distribution alteration unit 230 using the data calculated by the CGH system will be described.

First, on a base substrate 400, a photoresist layer is changed by the light is coated to a desired thickness.

Then, the photoresist is exposed to the light according to the calculated data. At this time, the light exposure is controlled to form each reflecting pattern 231 in its own specific width.

Figure 6:
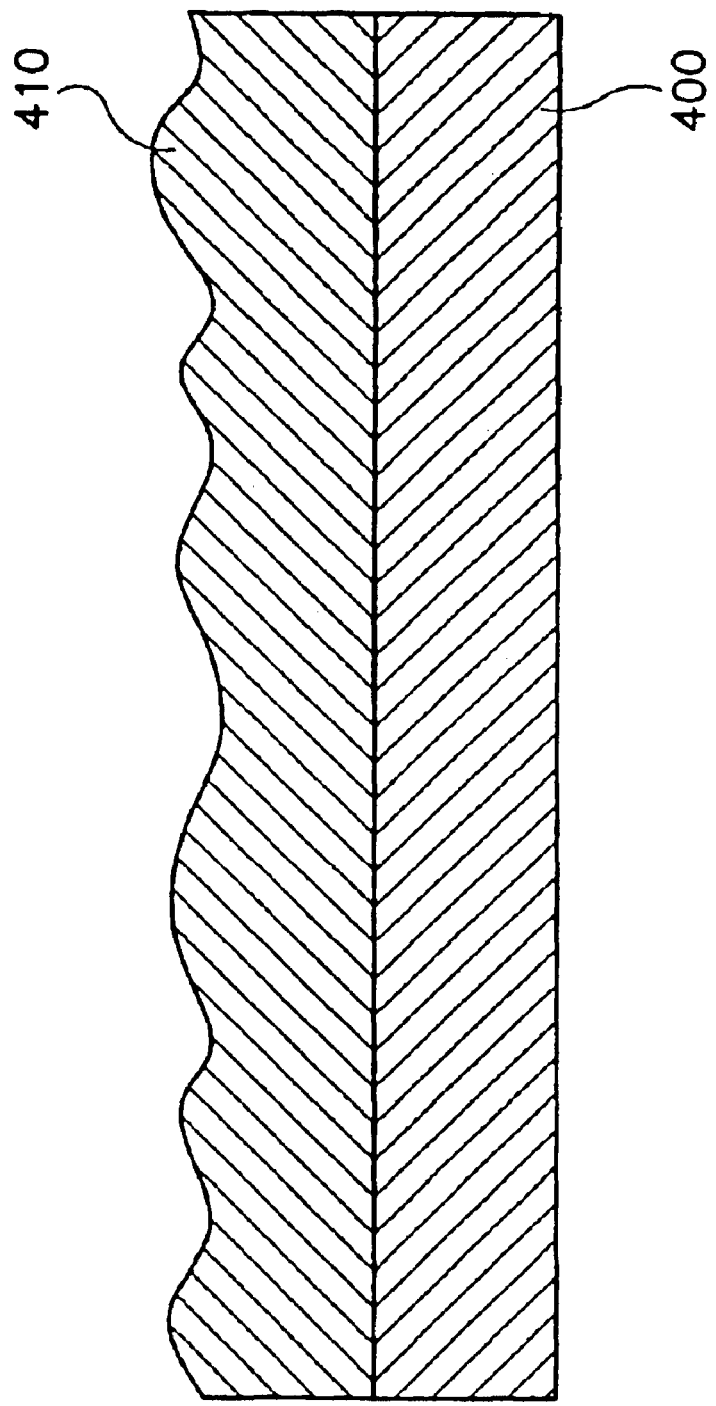
FIG. 6 is a cross-sectional process view showing a state that the light reflecting pattern is formed on a photoresist thin film when fabricating a light alteration unit.

Therefore, a concavo-convex pattern 410 is formed on the surface of the photoresist according to the forming data, as shown in FIG. 6.

At this time, the concavo-convex pattern 410 has the same shape as the reflecting pattern 231. However, the shape of the photoresist material can be further changed by the light. Therefore, in order to prevent the further changing of the shape of the photoresist material, an additional mold fabricating process is necessary to fabricate a mold through the medium of a photoresist thin film.

Figure 7:
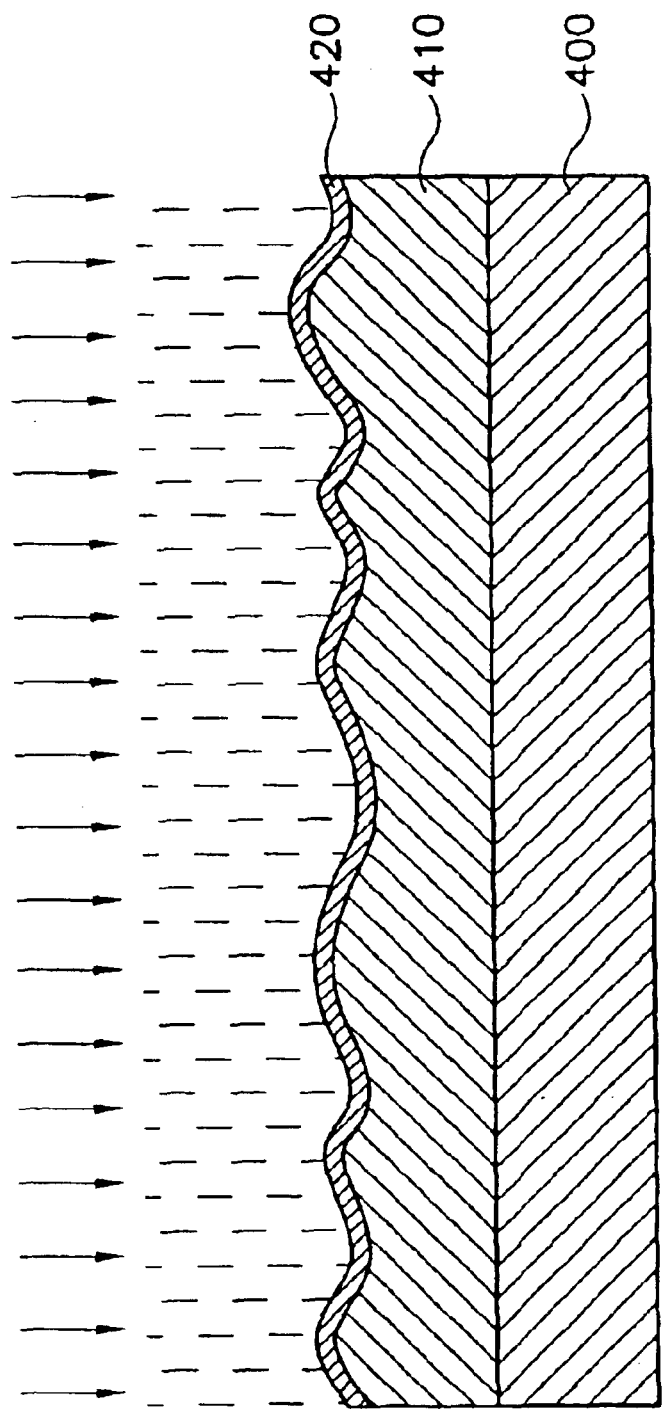
FIG. 7 is a cross-sectional process view showing a state that a thick metal layer is formed on the photoresist layer by a sputtering method.
Figure 8:
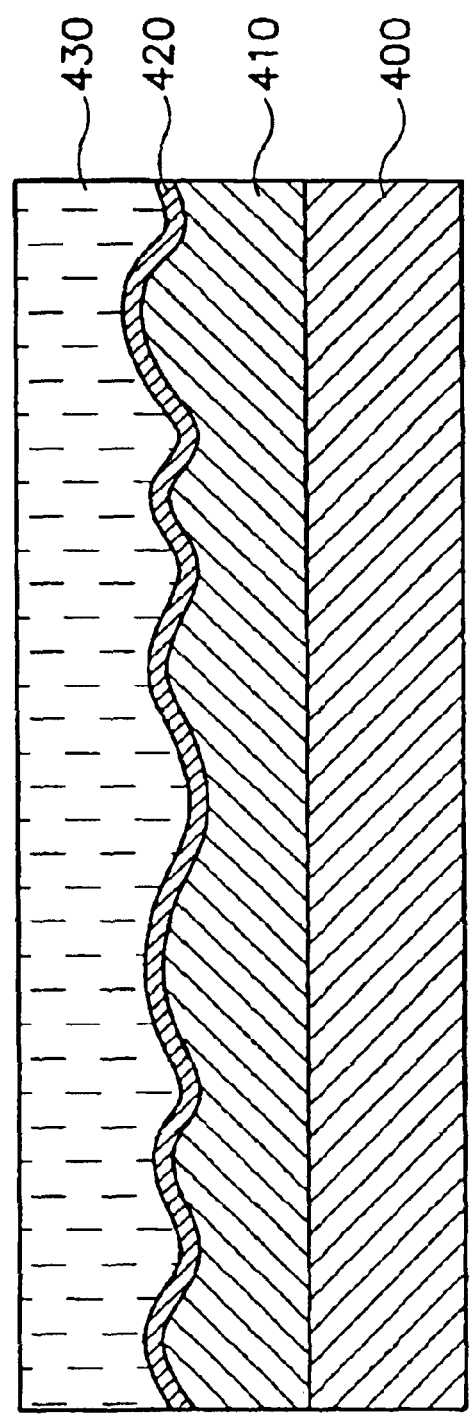
FIG. 8 is a cross-sectional process view showing a state that a hard molding material is coated on the metal layer.
Figure 9:
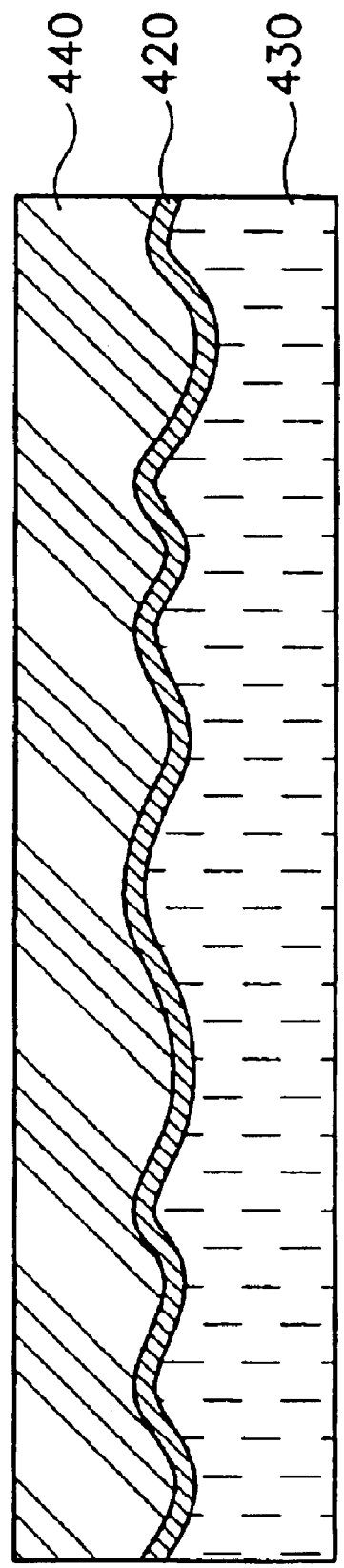
FIG. 9 is a cross-sectional process view showing a state that, after separating the molding material and the metal layer, a mold layer is formed on the metal layer.

As shown in FIG. 7, on a surface of the concavo-convex pattern 400, a metallic material layer 420 is formed thick by a sputtering method. The metallic material layer 420 is used as a preliminary mold.

Then, on an upper face of the preliminary mold 420 is formed a molding material 430 having a sufficient strength for fabricating a mold 440.

Then, the preliminary mold 420 and the molding material 430 are separated from the concavo-convex pattern 410. The mold 440 is formed by the preliminary mold 420 and the molding material 430.

An injection material for the light distribution alteration unit 230 is formed on the mold 440 by an injecting or extruding method. Now, the light distribution alteration unit 230 is formed.

Figure 10:
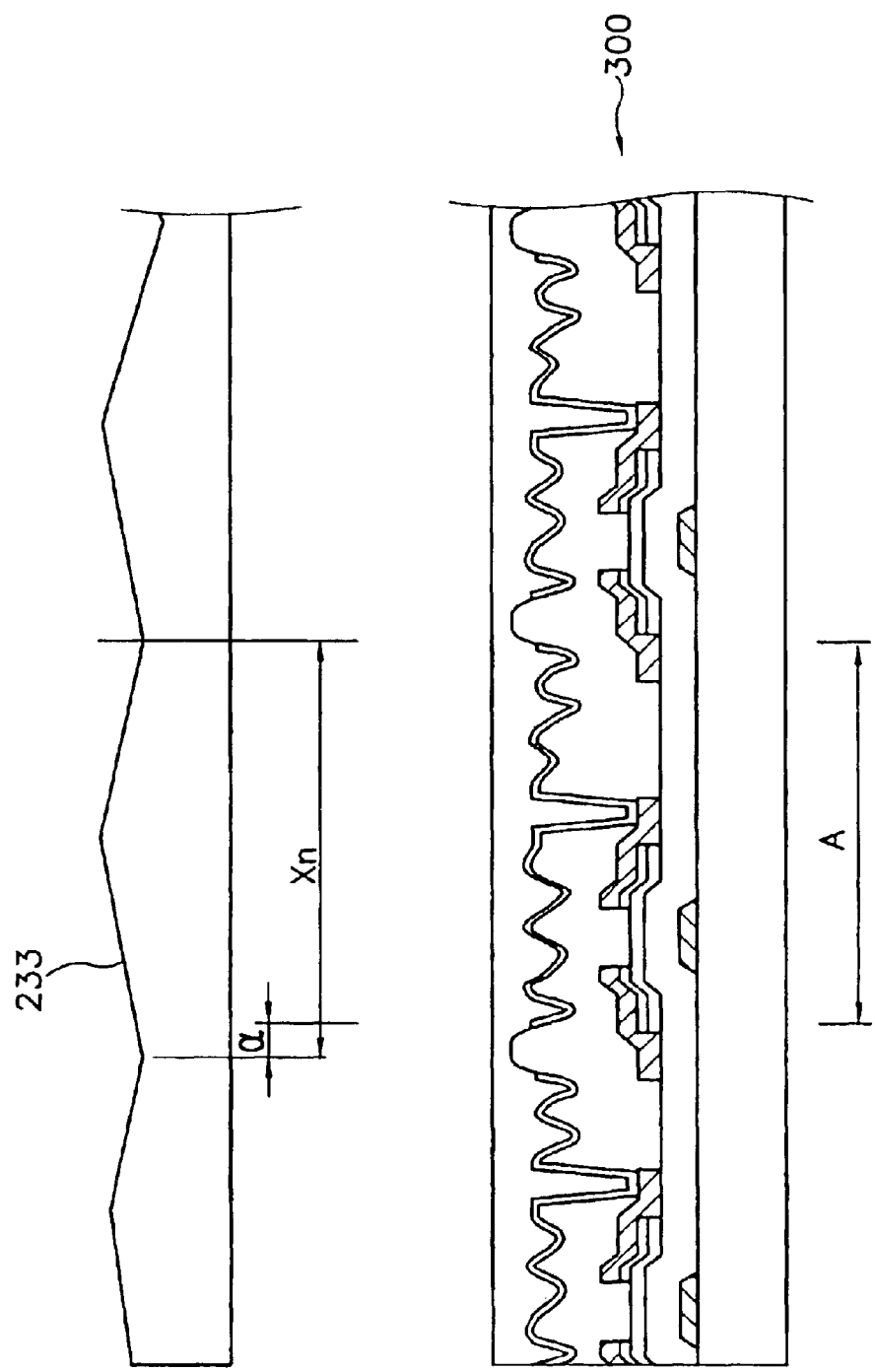
FIG. 10 is a view illustrating a second embodiment of the present invention.
Figure 11:
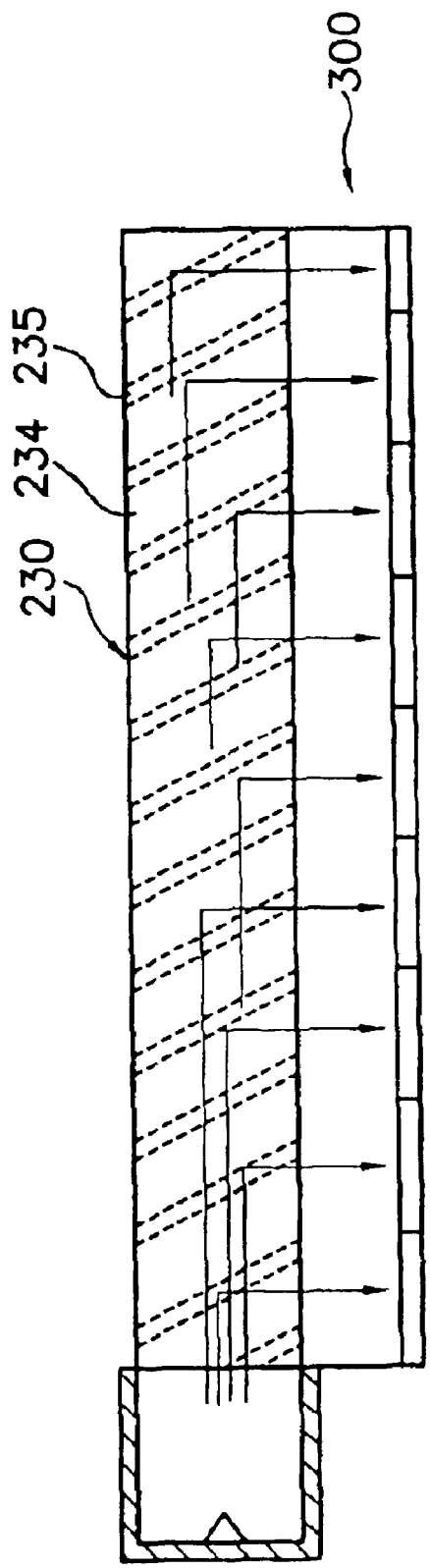
FIG. 11 is a view illustrating a third embodiment of the present invention.
Figure 12:
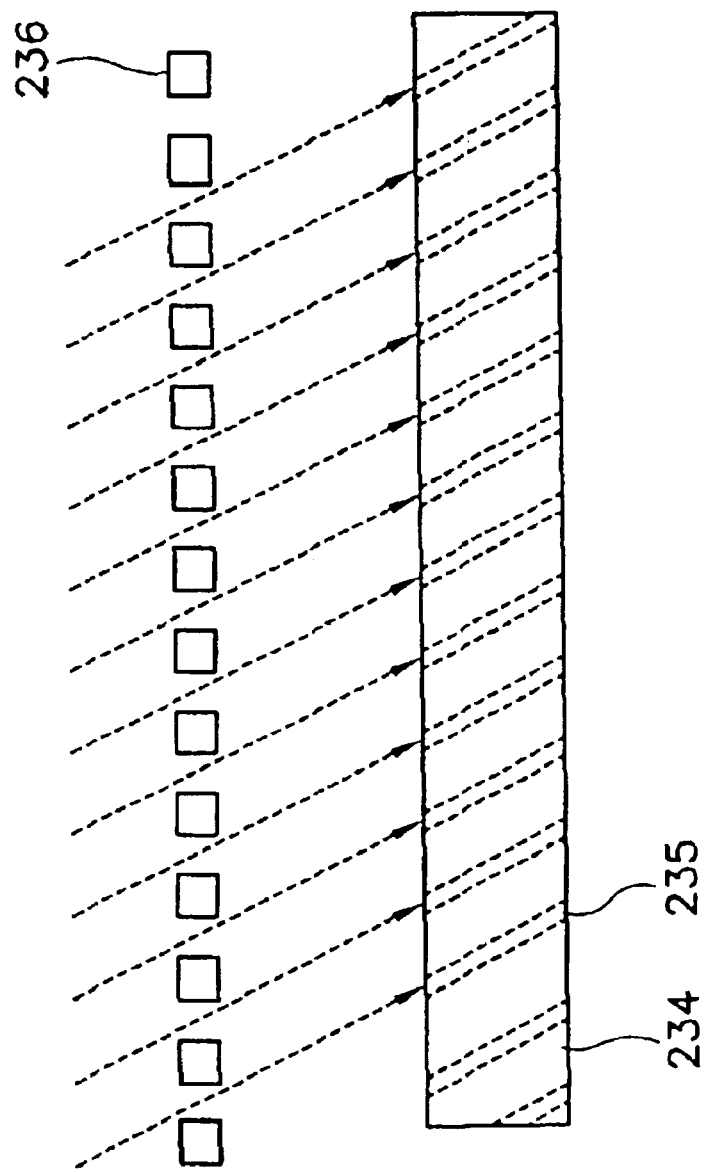
FIG. 12 is a view illustrating a fabricating process of the third embodiment of the present invention.

FIGS. 10, 11 and 12 show a second embodiment of the present invention.

In this embodiment, the light distribution alteration unit 230 has a reflecting pattern 233 for preventing the moire having a desired ratio with respect to the number of the reflecting electrode 340. Preferably, the desired ratio is 1:1. The width of the reflecting pattern 233 varies in the predetermined range based on the pitch L of the reflective electrode 340.

$$Xn = A \pm a (0 < a < A \text{ or } 0 < a < A/2) \qquad \text{[Equation 1]}$$

Here, Xn is the width of the reflecting pattern 233 of the light distribution alteration unit 230, a is a variable having a random value in the predetermined range and A is the pitch of the reflective electrode 340.

In case the width of the reflecting pattern 233 is calculated by the equation, and the light distribution alteration unit 230 is formed based on the calculated width, the moire due to the reflective electrode 340 and the reflecting pattern 233 is minimized.

All the reflecting patterns 233 are formed into a similar shape but has a different size. That is, the reflecting patterns 233 may be formed to have a different width and height.

Otherwise, the reflecting patterns 233 may be formed to have the same height and a different width. That is, each of the reflecting patterns 233 is formed into a different shape.

Figure 13:
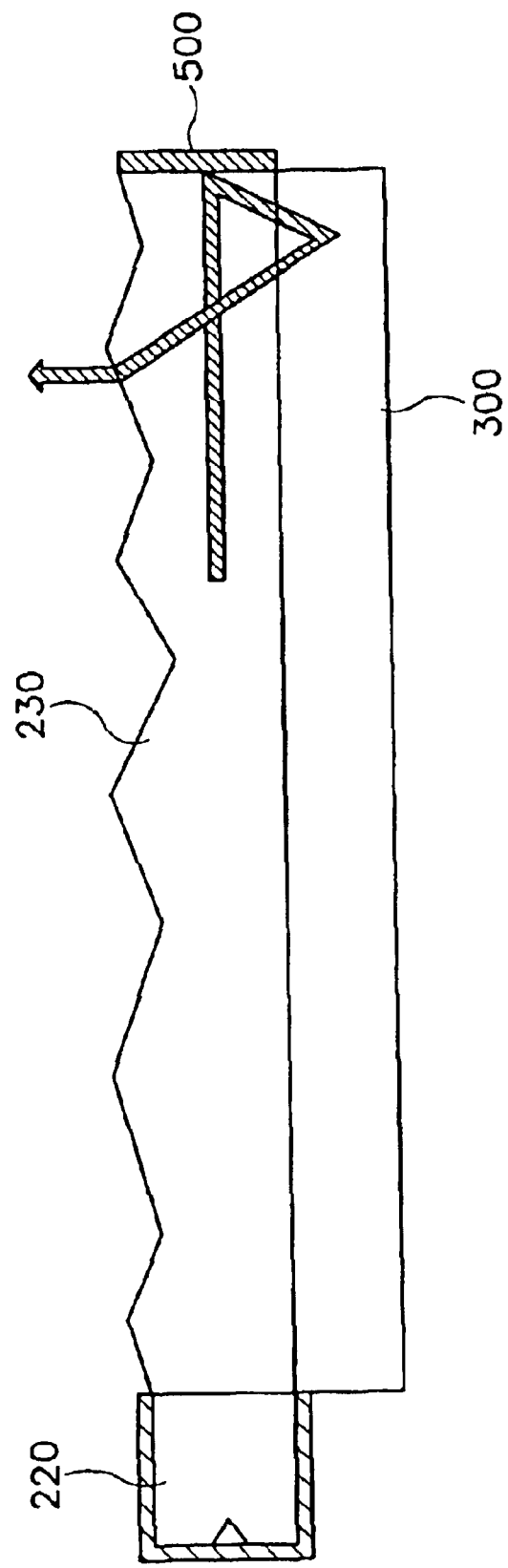
FIG. 13 a view illustrating a process for preventing light leakage and realizing high luminance with low power consumption in the reflective type LCD according to the present invention.

Meanwhile, in FIG. 11 or 13, at an inner portion of the light distribution alteration unit 230, there is formed a light reflecting portion 235 having a different refractive index from other portions, thereby providing the same effect as the above two embodiments.

Particularly, a material that reacts with the light having a specific wavelength and has a different refractive index at a portion reacted with the light, is used to form the light distribution alteration unit 230.

At this time, the number of the portion having the different refractive index is determined at a desired ratio with respect to the number of the reflective electrode of the LCD, as described in the second embodiment. Preferably, the ratio is 1:1.

The position of the portion having the different refractive index varies randomly in the predetermined range based on the pitch of the reflective electrode, thereby minimizing the moire generated by two overlapped pattern.

In order to fabricate the second light distribution alteration unit 230 having a distinctive structure as shown in FIG. 11, there is provided a flat plate of which the refractive index changes when the flat plate is exposed to the light of certain wavelength. Then, a mask 236, having a slit-shaped opening corresponding to the position of the different refractive index, is provided on the second light distribution alteration unit 230. The light is scanned on the mask 236 in a desired direction corresponding to a direction that light refraction should be occurred. In this embodiment, the light is scanned in the form of an oblique line.

In the above three embodiments, commonly, the light irradiated from the first light distribution alteration unit 220 leaks out in a direction opposite to the first light distribution alteration unit 220, while passing through the second light distribution alteration unit 230.

The light leakage lowers the luminance of an image displayed from the reflective type LCD 300. Therefore, to prevent the light leakage, as shown in FIG. 13, a light leakage preventing unit 500 is provided at the light distribution alteration unit 230 by performing a reflection treating process at the leaked portion.

The present invention minimizes the moire frequently generated in a conventional reflective type LCD and prevents the degradation of the display. Also, the light supplied to a LCD panel is lost minimally and high luminance with low power consumption can be achieved.

While the present invention has been described in detail, it should be understood that various changes, substitutions and alterations can be made hereto without departing from the spirit and scope of the invention as defined by the appended claims.

What is claimed is:

1. A method for fabricating a light distribution alternation unit used in a reflective type LCD, comprising steps of:

calculating pattern data for preventing moire phenomenon, based on a reflective electrode;

forming a light transforming pattern on a photoresist layer corresponding to the pattern data;

depositing a desired material on the light transforming pattern to form a preliminary mold;

forming a mold of the light transforming member through a medium of the preliminary mold; and forming the light transforming member using the mold.

2. The method of claim 1, wherein the pattern data are calculated by an equation $X_n = A \pm a$ ($0 < a < A$ or $0 < a < A/2$), wherein $X_n$ is a width of the pattern, $A$ is a pitch of the reflective electrode and $a$ is a variable width having a random value in a predetermined range.

3. The method of claim 1, wherein the pattern data are calculated using a computer generating hologram system.

* * * * *